(12) United States Patent
Demaratos

(10) Patent No.: US 12,088,041 B2
(45) Date of Patent: Sep. 10, 2024

(54) OUTER HOUSING, HAVING AT LEAST A CONDUCTIVE TAB, FOR ACCOMMODATING THEREIN A SEAL SPRING

(71) Applicant: J.S.T. CORPORATION, Farmington Hills, MI (US)

(72) Inventor: David Demaratos, Wixom, MI (US)

(73) Assignee: J.S.T. CORPORATION, Farmington Hills, MI (US)

( * ) Notice: Subject to any disclaimer, the term of this patent is extended or adjusted under 35 U.S.C. 154(b) by 258 days.

(21) Appl. No.: 17/703,806

(22) Filed: Mar. 24, 2022

(65) Prior Publication Data

US 2022/0320803 A1 Oct. 6, 2022

Related U.S. Application Data

(60) Provisional application No. 63/169,511, filed on Apr. 1, 2021.

(51) Int. Cl.
*H01R 13/00* (2006.01)
*F16J 15/02* (2006.01)
*H01R 13/52* (2006.01)
*H01R 13/506* (2006.01)
*H01R 13/652* (2006.01)
(Continued)

(52) U.S. Cl.
CPC ........ *H01R 13/5219* (2013.01); *F16J 15/024* (2013.01); *F16J 15/025* (2013.01); *F16J 15/028* (2013.01); *H01R 13/506* (2013.01); *H01R 13/5202* (2013.01); *H01R 13/5208* (2013.01); *H01R 13/5216* (2013.01); *H01R 13/652* (2013.01); *H01R 13/6581* (2013.01); *H01R 43/005* (2013.01); *H01R 43/18* (2013.01)

(58) Field of Classification Search
CPC ........ F16J 15/028; F16J 15/024; F16J 15/025; H01R 13/5202; H01R 13/652; H01R 13/6581; H01R 43/005; H01R 43/18
See application file for complete search history.

(56) References Cited

U.S. PATENT DOCUMENTS 4,195,893 A 4/1980 Stupay
5,782,657 A 7/1998 Wolla
(Continued)

OTHER PUBLICATIONS

International Search Report for International Application No. PCT/US2022/022391 dated Aug. 19, 2022 (4 sheets).
(Continued)

*Primary Examiner* — Pete T Lee
(74) *Attorney, Agent, or Firm* — Kratz, Quintos & Hanson, LLP

(57) ABSTRACT

The present invention involves an outer housing, having a tab or plurality of tabs, the housing accommodating a seal (seal spring), a second outer housing, and a third outer housing. The tabs being conductive coated to provide an element or portion of a grounding scheme for a connector assembly containing the outer housing. The tabs make substantial contact with the third outer housing and complete a portion of the connector assembly grounding scheme. When the outer housing is provided with a seal spring, the seal spring provides more force, additional force, for higher contact pressure with the third outer housing than would be present without the seal spring.

12 Claims, 4 Drawing Sheets

(51) Int. Cl.
  *H01R 13/6581* (2011.01)
  *H01R 43/00* (2006.01)
  *H01R 43/18* (2006.01)

(56) References Cited

U.S. PATENT DOCUMENTS

| | | | |
|---|---|---|---|
| 6,015,304 | A | 1/2000 | Yagi |
| 6,234,847 | B1 | 5/2001 | Chang |
| 7,976,340 | B1 | 7/2011 | Saraswat |
| 10,116,078 | B1 | 10/2018 | Durse et al. |
| 2001/0053624 | A1 | 12/2001 | Medina |
| 2002/0142636 | A1 | 10/2002 | Murr |
| 2004/0147146 | A1 | 7/2004 | Vermeersch |
| 2006/0134982 | A1 | 6/2006 | Zarganis |
| 2007/0059970 | A1 | 3/2007 | Ichio |
| 2008/0057758 | A1 | 3/2008 | Walter |
| 2008/0139035 | A1* | 6/2008 | Kim .................... H01R 13/641 439/352 |
| 2008/0299826 | A1 | 12/2008 | Cheng |
| 2008/0318473 | A1 | 12/2008 | Morikawa |
| 2010/0003852 | A1 | 1/2010 | Myer |
| 2010/0160991 | A1 | 6/2010 | Lim |
| 2011/0280653 | A1 | 11/2011 | Sjostedt |
| 2013/0072063 | A1 | 3/2013 | Qiao |
| 2014/0106597 | A1* | 4/2014 | Gimbel .................. H01R 13/62 439/345 |
| 2017/0018874 | A1 | 1/2017 | Kida |
| 2017/0317448 | A1* | 11/2017 | Benichou ............... H01R 13/50 |
| 2019/0214764 | A1* | 7/2019 | Forell ................ H01R 13/4361 |

OTHER PUBLICATIONS

International Search Report for International Application No. PCT/US2022/022605 dated Aug. 19, 2022 (4 sheets).
International Search Report for International Application No. PCT/US2022/022912 dated Jul. 8, 2022 (2 sheets).

* cited by examiner

OUTER HOUSING, HAVING AT LEAST A CONDUCTIVE TAB, FOR ACCOMMODATING THEREIN A SEAL SPRING

CROSS-REFERENCE TO RELATED PATENT APPLICATION

This patent application claims priority to Provisional Patent Application Ser. No. 63/169,511 filed on Apr. 1, 2021, which is hereby incorporated herein by reference in its entirety.

BACKGROUND OF THE INVENTION

It is desired that an outer housing is provided with tabs, the tabs providing contact pressure against an inner housing and the tabs further being provided with a conductive coated surface for completing a grounding scheme within a completed connector assembly. The outer housing, also being able to accommodate a seal (seal spring) providing additional force against the tabs, providing for higher contact pressure against an inner housing when used within a completed connector assembly.

SUMMARY OF THE INVENTION

The present invention involves an outer housing, having a tab or plurality of tabs within an inner cavity. The outer housing may accommodate a seal (seal spring), a second outer housing, and a third outer housing in its inner cavity, when in use. The tabs of the outer housing extend within the inner cavity of the outer housing, towards an opening of the outer housing. The outer housing also has a seal forward stop to prevent the further forward motion of the seal (seal spring) into the inner cavity. The seal (seal spring) will interact with the tabs when the seal (seal spring) is inserted within the inner cavity, and will apply a spring force against the tabs when fully inserted.

The tabs of the outer housing are conductive coated to provide an element or portion of a grounding scheme for a connector assembly containing the outer housing. The tabs make substantial contact with the third outer housing and complete a portion of the connector assembly grounding scheme when the outer housing is used in a completed connector assembly. When the outer housing is provided with a seal spring, the seal spring provides more force, additional force, for higher contact pressure with the third outer housing than would be present without the seal spring.

DETAILED DESCRIPTION OF THE PREFERRED EMBODIMENTS

Figure 1:
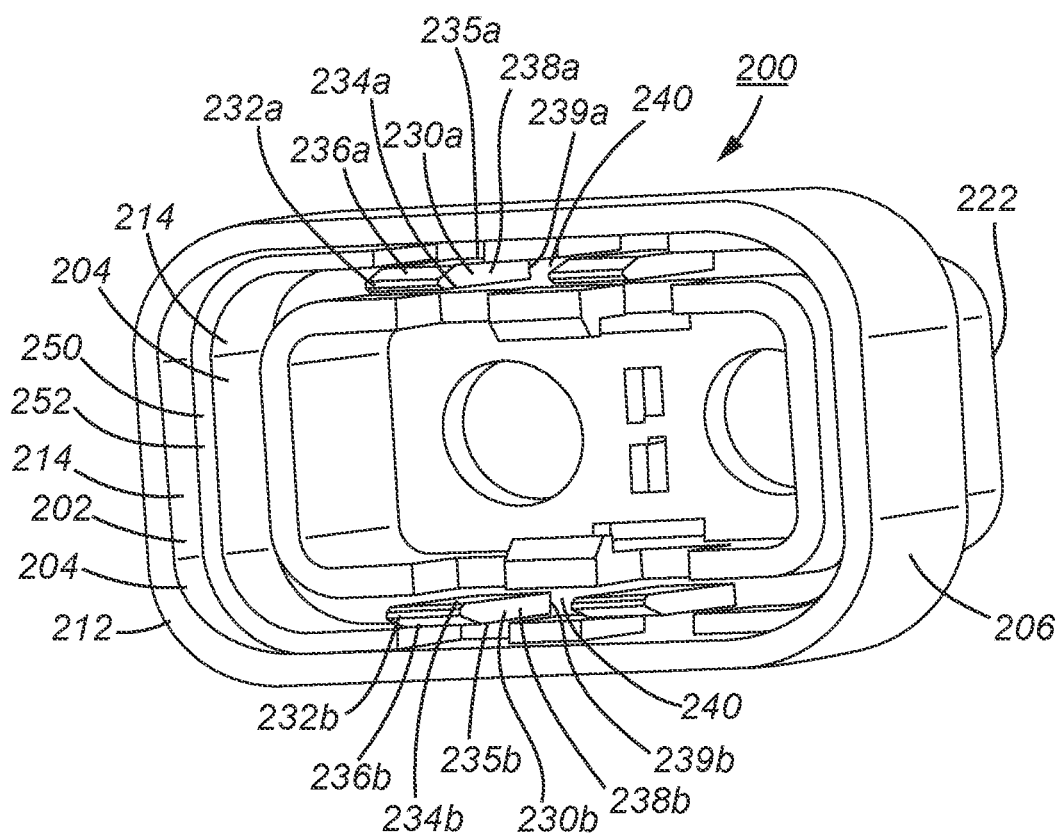
FIG. 1 is an end perspective view of the outer housing of the present invention.

Shown in FIG. 1 is the outer housing 200 of the connector assembly. The outer housing 200 has a body 206. At one end of the body 206 is the first end portion 212, and at the opposite end is the second end portion 222. The body 206, also has an inner cavity 204, the inner cavity 204 having a side wall 214. Additionally, the inner cavity 204 of the outer housing 200 has an opening 202 within the first end portion 212 of the outer housing 200. The opening 202 leading to the inner cavity 204. The inner cavity 204 of the outer housing 200 also has a seal forward stop 250 having a surface 252. The seal forward stop 250 with a surface 252, extending substantially perpendicular along its length from the side wall 214 with respect to a lengthwise direction of the outer housing 200 (being defined as the direction from the first end portion 212 to the second end portion 222, and vice versa). The seal forward stop 250 and its surface 252 are provided to interact with a seal spring 100 when the seal spring 100 is inserted into the inner cavity 204, and the seal spring 100 is in use with the outer housing 200. The seal forward stop 250 being provided to prevent and halt the further, forward insertion of the seal spring 100 into the inner cavity 204 towards the second end portion 222 (see, FIG, 2-4).

The outer housing 200 is preferably made of a contiguous single construct or form, no welding or brazing. Moreover, the outer housing 200 of the present invention is, substantially, in its entirety, of a contiguous and continuous single construction. No part or section of the outer housing 200 of the present invention is made up of welded, soldered, or brazen part or section.

Also shown in FIG. 1 is the first tab 230a of the outer housing 200 and the second tab 230b of the outer housing 200. The outer housing 200 may have a pair of first tabs 230a, as shown, but the quantity is not limited thereto. The outer housing 200 may have a pair of second tabs 230b, as shown, but the quantity is not limited thereto. The first tab 230a of the outer housing 200 and the second tab 230b of the outer housing 200 extend within the inner cavity 204, extending substantially perpendicularly from a rear wall 240 of the outer housing 200. The rear wall 240 is within the inner cavity 204 and extends substantially perpendicular along its length from the side wall 214 of the inner cavity 204 of the outer housing 200, with respect to a lengthwise direction of the outer housing 200 (being defined as the direction from the first end portion 212 to the second end portion 222, and vice versa). The first tab 230a and second tab 230b each have a tip 232a, 232b, respectively, located at an end of each tab 230a, 230b. The tab 230a, 230b extends within the inner cavity 204 towards the opening 202, the direction of which having the tip 232a, 232b facing substantially towards the opening 202 of the outer housing 200. The other, opposite end of the tab 230a, 230b, is the attached end 239a, 239b. The attached end 239a, 239b is the portion of the tab 230a, 230b attached to the rear wall 240 of the outer housing 200. Each tab 230a, 230b having a cantilever beam arm 238a, 238b, respectively. The cantilever beam arm 238a, 238b is formed by and along the length of the tab 230a, 230b, more specifically, by the portion of the tab 230a, 230b between the attached end 239a, 239b and the tip 232a, 232b.

The first tab 230a and second tab 230b, each also have an angled lead in 236a, 236b, respectively. Each of the angled lead in 236a, 236b is angled, or tapered generally along its length towards the tip 232a, 232b, and tapering in a direction with respect to the lengthwise direction of the outer housing 200 (being defined as the direction from the first end portion 212 to the second end portion 222, and vice versa). Each of the angled lead in 236a, 236b substantially faces the side wall 214 of the inner cavity 204 of the outer housing 200. The angled lead in 236a, 236b of each of the first tab 230a and second tab 230b are provided to make contact with the seal spring 100 when in use, and as discussed later.

The first tab 230a and second tab 230b each also have a first surface 234a, 234b and a second surface 235a, 235b, respectively. Each first surface 234a, 234b face the inner cavity 204 of the outer housing 200. Each first surface may face another one of a first surface 234a, 234b. As seen in FIG. 1, along its length, the first surface 234a of the first tab 230a substantially faces the opposing, opposite, first surface 234b of the second tab 230b, and vice versa. The second surface 235a, 235b faces the side wall 214 of the inner cavity 204 of the outer housing 200.

Figure 2:
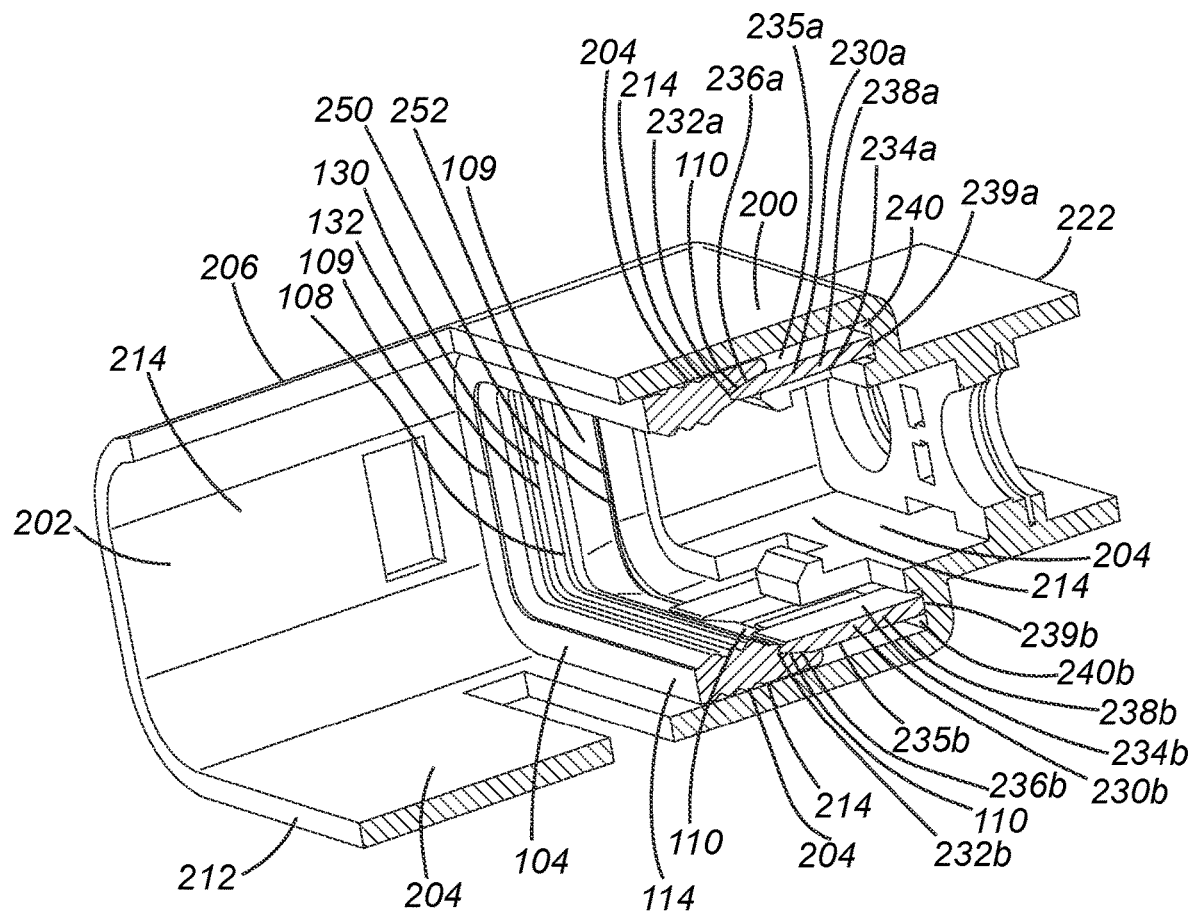
FIG. 2 is a cross section view of the outer housing and the seal spring, the seal spring residing in the outer housing.

Illustrated in FIG. 2 is the outer housing 200 with the seal spring 100 inserted. Here the seal spring 100 is inserted into the outer housing 200, and the first face 102 is inserted first towards the rear 222 of the outer housing 200. The first face 102 and first face surface 112 of the seal spring 100 may also abut the forward stop 250 and surface 252 thereof The first tab 230a and second tab 230b of the outer housing 200 have entered the inner aperture 108 of the seal spring 100, the respective tips 232a, 232b have initially entered the inner aperture 108 of the seal spring 100 and have made contact with the seal spring 100. Further, the angled lead in 236a, 236b of each of the respective tab or tabs 230a, 230b will make further contact with the inner side wall 109 of the seal spring 100 as the seal spring 100 is inserted further into the outer housing 200. as shown.

Figure 3:
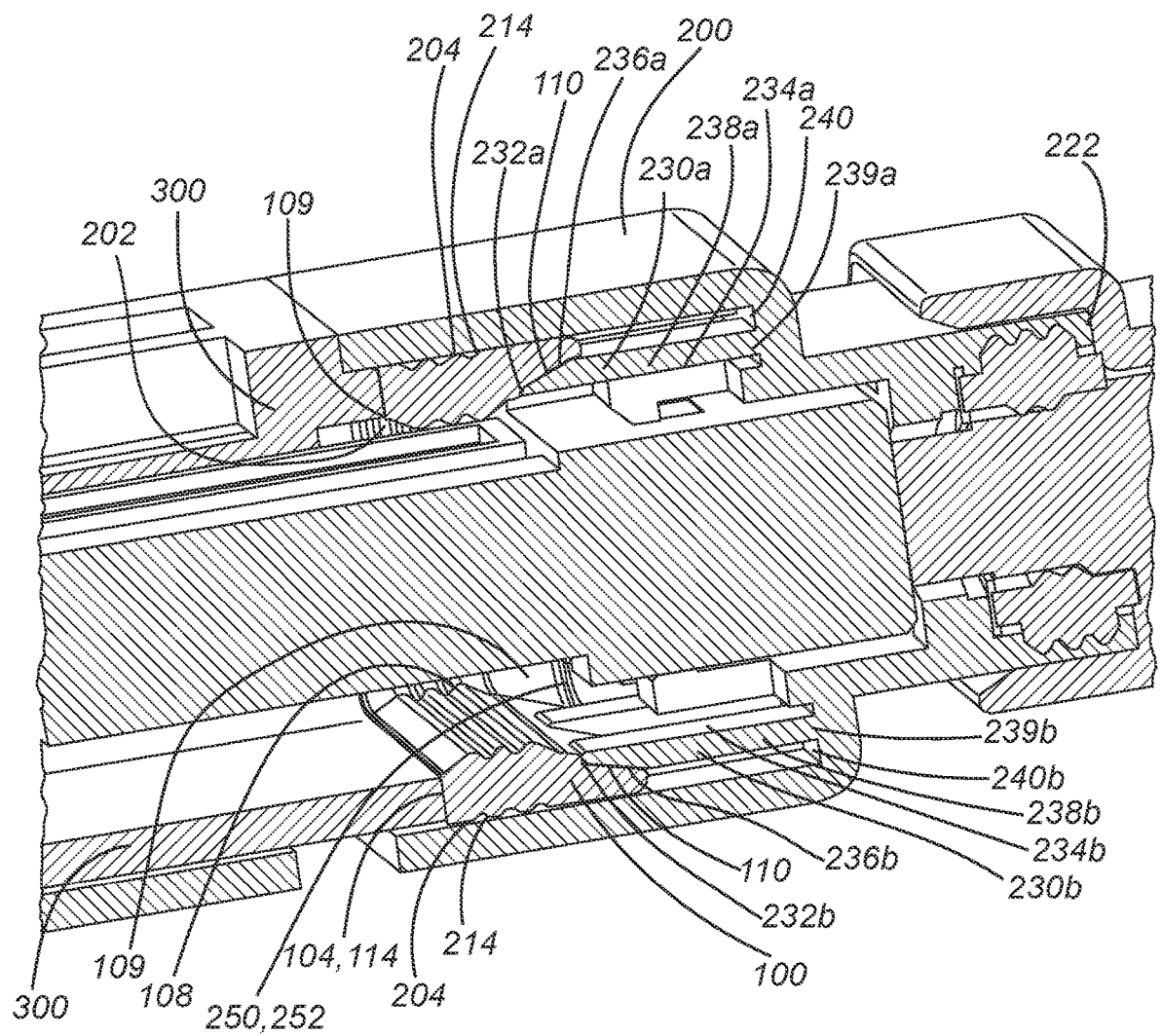
FIG. 3 is a cross section view of the outer housing, the outer housing having the seal spring inserted and residing in the cavity of the outer housing, the second outer housing installed.

As seen in FIG. 3, the seal spring 100 may be inserted into the outer housing 200 and the seal spring 100 will be held in the outer housing 200 by a second Outer housing 300. The cavity of the outer housing 200 and the seal spring 100 has a space wherein a third outer housing 400 may be inserted and accommodated, as will be seen in FIG. 4.

As discussed above, the tabs 230a, 230b abut and contact against the surface 110 of the inner side wall 109 of the seal spring 100. More specifically, the tabs 230a, 230b abut and contact the flared, or angled portion of the inner side wall 109. The flared, or angled portion of the inner side wall 109 of the seal spring 100 compresses as the tab 230a, 230b enters the inner aperture 108 and contacts the seal spring 100, wherein the seal spring 100 asserts a spring-like force against the tab 230a, 230b. The tabs 230a, 230b, as shown in FIG. 2, have pressed into, and pushed into the inner surface 109 of the seal spring 100. The seal spring 100 can be further inserted into the outer housing 200 and tabs 230a, 230b and will further press into, and push into the inner surface 109 of the seal spring 100 when the second outer housing 300 is inserted and subsequent third outer housing 400 is then inserted (See, FIG. 3, 4). The seal spring 100 will provide and exert an adequate spring force against the tab 230a, 230b and apply its spring force, pushing itself in an outward direction towards and against the tip 232a, 232b, the angled lead in 236a, 236b, and the second surface 235a, 235b of the tab 230a, 230b when in use. Further, the angle or taper of the inner side wall 109 is such that the angled lead in portion 236a, 236b of the tab 230a, 230b will reside on the flared, or angled portion of the inner side wall 109 when the tab 230a, 230b makes substantial contact with the surface 110 of the inner side wall of seal spring 100. The tip 232a, 232b of each tab 230a, 230b, may not make substantial contact with the first face 102 of the seal spring 100, as it is inserted into the housing 200. Therein, the first face 102. will reside below the tip 232a, 232b, angled lead in 236a, 236b, and the second surface 235a, 235b when the seal spring 100 is inserted. Moreover, the angle or taper of the inner side wall 109, is such that the flared, or angled portion of the inner side wall 109 will reside below the angled lead in portion 236a, 236b of the respective tab 230a, 230b. Thus, the spring force of the seal spring 100 is asserted and applied to the tab 230, 230b by the angle or tapered portion of the inner side wall 109. More specifically, the spring force is generally directed toward and against the angled lead in portion 236a, 236b of the tab 230a, 230b. The tab 230a, 230b is slightly flexible, and is preferably flexible along its length at the cantilever beam arm 238a, 238b portion. The tab 230a, 230b will flex when the tip 232a, 232b, angled lead in 236a, 236b, or second surface 235a. 235b is contacted, as here, by the seal spring 100 (see, FIG. 3, 4). The angle or taper of the inner side wall 109 of the seal 100 also prevents the seal spring 100 from being marred, warped, ripped, or torn or otherwise destructed in its use, when it comes in contact with the tab 230a, 230b or similar feature of a connector housing, when inserted and in use. Likewise, the angled lead in 236a, 236b prevents the seal spring 100, or other inserted seal, from being marred, warped, ripped or torn or otherwise destructed in its use.

The tabs 230a, 230b of the outer housing 200 have a conductive coating, the tabs 230a, 230b are therefore able to provide an element or portion of a grounding scheme for a connector assembly containing the outer housing 200. Here, the conductive coating provides for a grounding scheme involving the outer housing 200, to interact with an inserted third outer housing 400 (see, FIG. 4). More specifically, the cantilever beam portion of the tab 230a, 230b, may make substantial contact with the third outer housing 400. The seal spring 100 will provide a compression and spring force against the tab 230a, 230b and press the tab 230a, 230b against the third outer housing 400 when assembled. Thus, a portion of the connector assembly grounding scheme is completed when the tab 230a, 230b contacts the third outer housing 400.

Figure 4:
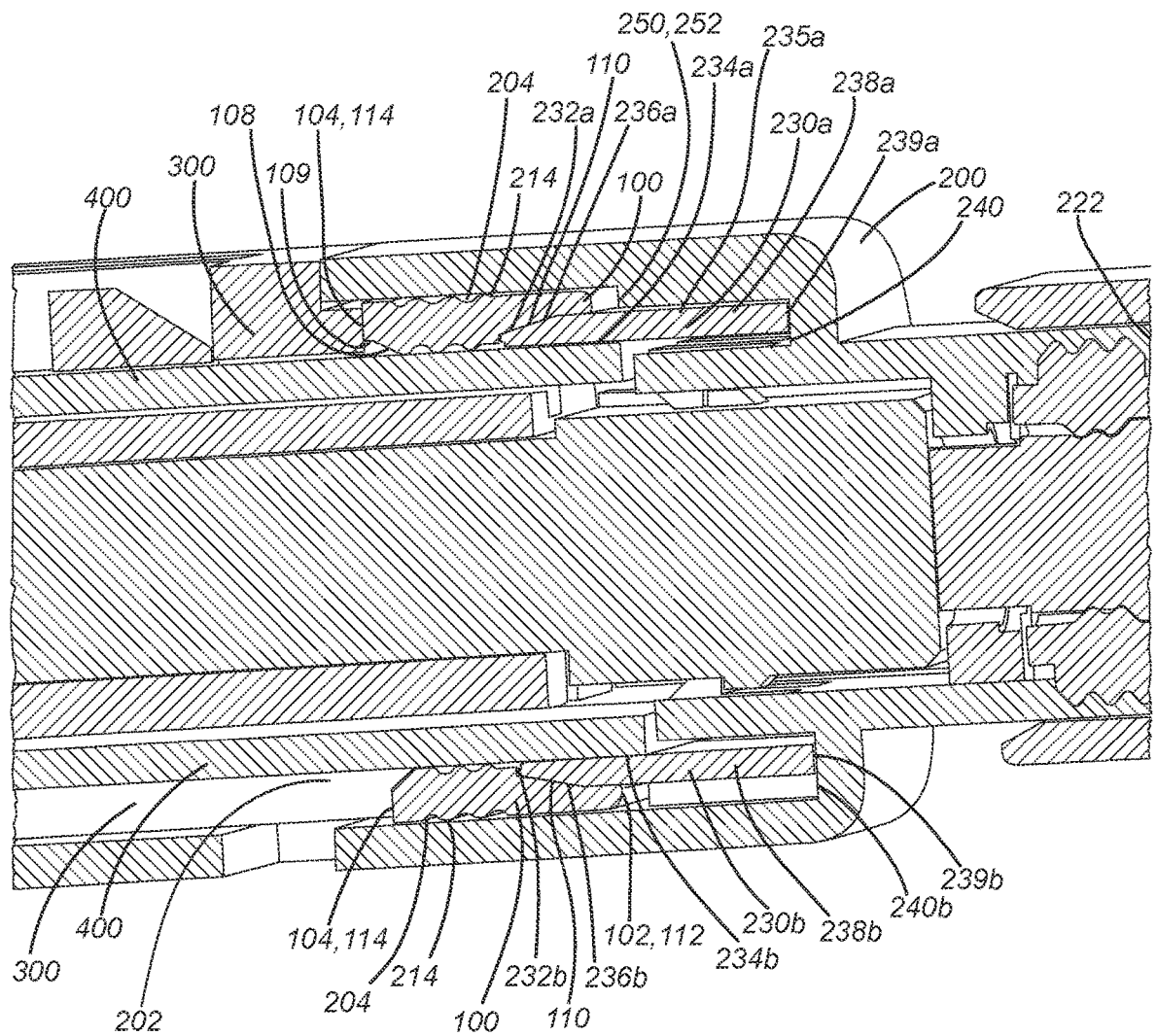
FIG. 4 is a cross section view of the completed connector assembly having the outer housing, the outer housing having the seal spring inserted and residing in the cavity of the outer housing, the second outer housing installed, the third outer housing installed.

Illustrated in detail within FIG. 4 is an example of the outer housing 200 being fully assembled in a completed connector assembly, having the seal spring 100, the second outer housing 300, and the third outer housing 400 present. Here, as mentioned, the cantilever beam arm 238a, 238b will slightly flex, the flexing motion being in a direction opposite, or counter to, the direction the tab 230a, 230b makes contact with the inner side wall 109 of the seal spring 100. The direction the tab 230a, 230b flexes is generally inwards, a direction towards the inner cavity 204, inner aperture 108 or opposing one of another tab 230a, 230b (as discussed previously). Thus, as shown in FIG. 4 the first surface 234a, 234b of each of the tabs 230a, 230b will further contact the surface of the third outer housing 400 which has been inserted, is present, and resides within the outer housing 200 in the completed connector assembly. Here, the third outer housing 400 is engaging with the first surface 234a, 234b and presses the tabs 230a, 230b further into the inner side wall 109 of seal spring 100. Thereby, the seal spring 100 compresses which results in the generation of an upward spring force on the tab 230a, 230b, providing more force, additional force, for higher contact pressure of the tabs 230a, 230b against the third outer housing 400 than would be present without the seal spring 100. This force and subsequent pressure is much more resistant to stress relaxation compared to the use of the tab 230a, 230b, cantilever beam arm 238a, 238b, and housing 200 made from resin alone. The benefit of the seal spring 100, is higher contact pressure between the outer housing 200 and the third outer housing 400. The third outer housing 400 is preferably a plated resin housing, conductive, and aids in shielding of the connector assembly. The outer housing 200 is also preferably conductive, comprised of a metal infused resin and also aids in shielding of the connector assembly when in use. A portion of a grounding scheme for a connector assembly which uses the outer housing 200 can be completed when the tab 230*a*, 230*b* which is also preferably conductive coated, makes contact with the conductive third outer housing 400.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

I claim:

1. An outer housing, comprising:
   a body;
   an inner cavity, said inner cavity having a side wall;
   a tab, said tab located within said inner cavity, having a first surface, a second surface, and an angled lead in, said angled lead in abutting and contacting against a seal spring so as to provide and exert a spring force against said tab; and
   an opening, said opening leading into said inner cavity; and
   a rear wall.

2. The outer housing according to claim 1, wherein said cavity having a seal forward stop.

3. The outer housing according to claim 1, wherein said outer housing having another one of said tab.

4. The outer housing according to claim 1, wherein said outer housing having said tab, said tab being a first tab, and said outer housing having another one of said tab, wherein said another one of said tab being a second tab.

5. The outer housing according to claim 1, wherein said outer housing having said tab, said tab being conductive coated.

6. The outer housing according to claim 1, wherein said outer housing having said tab, said tab being a first tab, and said outer housing having another one of said tab, wherein said another one of said tab being a second tab, wherein said first tab and said second tab being conductive coated.

7. The outer housing according to claim 1, wherein said outer housing having said tab, said tab being a first tab, and said outer housing having another one of said tab, wherein said another one of said tab being a second tab, wherein said first tab and said second tab face each other.

8. The outer housing according to claim 1, wherein said outer housing having said tab, said tab being a first tab, and said outer housing having another one of said tab, wherein said another one of said tab being a second tab, wherein said first tab and said second tab face each other, wherein said first tab and said second tab being conductive coated.

9. A method for assembling an outer housing in a connector assembly, comprising the steps of:
   inserting a seal spring into an inner cavity of said outer housing;
   pushing said housing into said inner cavity of said outer housing;
   thereafter, pushing said seal spring into said outer housing so as to position said seal spring against a tab within said inner cavity of said housing;
   thereafter inserting a second outer housing into an inner cavity of said housing,
   thereafter, providing a spring force to said tab,
   thereafter inserting a third outer housing into an inner cavity of said housing; and
   thereafter, said tab contacts said third outer housing.

10. The method according to claim 9, wherein said method for assembling an outer housing in said connector assembly, said seal spring presses against a forward stop of said outer housing after said step of providing a spring force to said seal spring.

11. The method according to claim 9, wherein said method for assembling an outer housing with said seal spring, said seal spring contacts a third outer housing, said third outer housing inserts into an inner aperture of said seal spring, after said step of providing a spring force to said seal spring.

12. A method according to claim 9, wherein said method for assembling a outer housing with said seal spring, wherein said tab provides pressure against said third outer housing.

* * * * *